(12) United States Patent
Sugiyama

(10) Patent No.: US 7,627,213 B2
(45) Date of Patent: Dec. 1, 2009

(54) OPTICAL MODULATOR AND TRANSMITTER

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 123 days.

(21) Appl. No.: 11/902,491

(22) Filed: Sep. 21, 2007

(65) Prior Publication Data
US 2008/0095485 A1    Apr. 24, 2008

(30) Foreign Application Priority Data
Oct. 20, 2006    (JP)    ............... 2006-286789

(51) Int. Cl.
G02B 6/26    (2006.01)
G02B 6/42    (2006.01)
G02F 1/035    (2006.01)

(52) U.S. Cl. ............... 385/40; 385/3; 385/11

(58) Field of Classification Search ......... 385/1–3, 385/11, 40
See application file for complete search history.

(56) References Cited

U.S. PATENT DOCUMENTS

| | | | | |
|---|---|---|---|---|
| 4,797,641 | A * | 1/1989 | Djupsjobacka | 385/2 |
| 6,501,867 | B2 * | 12/2002 | Gates et al. | 385/2 |
| 6,594,407 | B2 * | 7/2003 | Doi et al. | 385/2 |
| 6,697,543 | B2 * | 2/2004 | Miyata et al. | 385/11 |
| 6,836,573 | B2 * | 12/2004 | Soda | 385/2 |
| 6,931,164 | B2 * | 8/2005 | Risser et al. | 385/3 |
| 6,947,614 | B2 * | 9/2005 | Porte et al. | 385/2 |
| 6,950,218 | B2 * | 9/2005 | Sugiyama et al. | 359/245 |
| 7,127,128 | B2 * | 10/2006 | Belmonte et al. | 385/2 |
| 2001/0007601 | A1 * | 7/2001 | Kondo et al. | 385/2 |
| 2003/0002766 | A1 * | 1/2003 | Pruneri et al. | 385/2 |
| 2003/0031400 | A1 * | 2/2003 | Pruneri | 385/14 |
| 2005/0175271 | A1 | 8/2005 | Sugiyama et al. | |
| 2005/0180694 | A1 | 8/2005 | Sugiyama et al. | |
| 2005/0213863 | A1 * | 9/2005 | Sugiyama et al. | 385/2 |
| 2006/0029319 | A1 * | 2/2006 | Sugiyama | 385/1 |
| 2006/0159384 | A1 * | 7/2006 | Sugiyama | 385/3 |

(Continued)

FOREIGN PATENT DOCUMENTS

AU    199745311    6/1998

(Continued)

OTHER PUBLICATIONS

N. Courjal et al., "LiNbO₃ Mach-Zehnder Modulator With Chirp Adjusted by Ferroelectric Domain Inversion", IEEE Photonics Technology Letters, vol. 14, No. 11, Nov. 2002; pp. 1509-1511.

(Continued)

Primary Examiner—Tina M Wong
Assistant Examiner—Rhonda S Peace
(74) Attorney, Agent, or Firm—Staas & Halsey LLP

(57) ABSTRACT

To reduce wavelength chirp and produce multi-valued signal light that can be readily demodulated on a receiver side, a Mach-Zehnder type optical modulator includes an incident waveguide that branches input light, a pair of optical waveguides that respectively transmit the branched light and exhibit an electro-optic effect, a pair of signal electrodes arranged along the optical waveguides, and an exit waveguide that outputs an interfered light of the light transmitted through the optical waveguides. Furthermore, at a boundary, the polarity of each of the optical waveguides reverses, and either the optical waveguides or the signal electrodes cross each other.

27 Claims, 15 Drawing Sheets

U.S. PATENT DOCUMENTS

| | | | |
|---|---|---|---|
| 2006/0210212 A1* | 9/2006 | Sugiyama | 385/3 |
| 2007/0036478 A1* | 2/2007 | Kim et al. | 385/1 |
| 2007/0217729 A1* | 9/2007 | Sugiyama et al. | 385/3 |
| 2008/0260321 A1* | 10/2008 | Sugiyama | 385/3 |

FOREIGN PATENT DOCUMENTS

| | | |
|---|---|---|
| CN | 1106089 | 4/2003 |
| JP | 2002-328347 | 11/2002 |
| JP | 2005-221874 | 8/2005 |
| WO | 02/51041 | 6/2002 |
| WO | 2006/088093 | 8/2006 |

OTHER PUBLICATIONS

K. Sekine et al., "40 Gbit/s, 16-ary (4bit/symbol) optical modulation/demodulation scheme", Electronics Letters, IEEE, vol. 41, No. 7, Mar. 31, 2005; pp. 430-432.

Extended European Search Report issued in corresponding European Patent Application No. 07018806.5 on Jan. 16, 2008.

Office Action, mailed May 8, 2009, in corresponding Chinese Patent Application No. 200710180889.6 (14 pp. including translation).

* cited by examiner

SIGNAL ELECTRODE103A:ON
SIGNAL ELECTRODE103B:ON

SIGNAL ELECTRODE103A:ON
SIGNAL ELECTRODE103B:OFF

SIGNAL ELECTRODE103A:OFF
SIGNAL ELECTRODE103B:ON

SIGNAL ELECTRODE103A:OFF
SIGNAL ELECTRODE103B:OFF

SIGNAL ELECTRODE103A:ON
SIGNAL ELECTRODE103B:ON

SIGNAL ELECTRODE103A:ON
SIGNAL ELECTRODE103B:OFF

SIGNAL ELECTRODE103A:OFF
SIGNAL ELECTRODE103B:ON

SIGNAL ELECTRODE103A:OFF
SIGNAL ELECTRODE103B:OFF

OPTICAL MODULATOR AND TRANSMITTER

CROSS-REFERENCE TO RELATED APPLICATIONS

This application is based upon and claims the benefit of priority from the prior Japanese Patent Application No. 2006-286789, filed on Oct. 20, 2006, the entire contents of which are incorporated herein by reference.

BACKGROUND OF THE INVENTION

1. Field of the Invention

The present invention relates to a Mach-Zehnder type optical modulator and a transmitter used in optical communication.

2. Description of the Related Art

Optical waveguide devices employing an electro-optic crystal such as lithium niobate ($LiNbO_3$) or lithium tantalate ($LiTaO_2$) are formed by thermally diffusing a metal film on a portion of a crystal substrate or effecting proton exchange in a benzoic acid after patterning to form an optical waveguide followed by provision of a signal electrode near the formed optical waveguide. A Mach-Zehnder type optical modulator having a branching interference type optical waveguide structure is one such optical waveguide device that employs an electro-optic crystal.

Two-valued modulation modes where a signal level is either 0 or 1 are commonly used in communication. However, in recent years, there has been growing development of multi-valued modulation modes using three values or four values to increase transmission capacity. Among multi-valued signals are signals that provide multiple values to an output intensity of light, a phase of light, and a combination thereof. Such an example is presented in Japanese Patent Application Laid-Open Publication No. 2005-221874.

Methods of using a Mach-Zehnder type optical modulator to provide multiple values to an output intensity of light, include a method of applying an electric field to one of the parallel optical waveguides by using a multi-valued electrical signal subjected to wave combination by an electrical coupler to generate a multi-valued signal light and a method of applying an electric field to each of the two parallel optical waveguides by independent electrical signals to generate a multi-valued signal light. Since the method of applying an electric field to each of the two parallel optical waveguides by using independent electrical signals does not require an electrical coupler, electrical signal loss and band deterioration does not occur, thereby making this method advantageous in cost and size.

FIG. 21 illustrates a structure of a conventional optical modulator. A conventional optical modulator 2100 includes an incident optical waveguide 2101, a pair of optical waveguides 2102a and 2102b, a pair of signal electrodes 2103A and 2103B, and an exit optical waveguide 2104. Light that enters from the incident optical waveguide 2101 diverges and is transmitted through the optical waveguide 2102a and the optical waveguide 210b. The light transmitted through the optical waveguide 2102a and the optical waveguide 2102b interfere with each other in the exit optical waveguide 2104 and is transmitted as a signal light.

The signal electrode 2103A and the signal electrode 2103B are arranged along the optical waveguide 2102a and the optical waveguide 2102b. For example, when a Z-cut crystal substrate is used, the signal electrode 2103A and the signal electrode 2103B are arranged directly above the optical waveguide 2102a and the optical waveguide 2102b, respectively. When electrical signals are input to the signal electrode 2103A and the signal electrode 2103B and a voltage is applied, an electric field in the direction of the Z-axis varies the refraction indexes of the optical waveguide 2102a and the optical waveguide 2102b.

The optical modulator 2100 controls electrical signals at the signal electrode 2103A and the signal electrode 2103B to produce a phase difference in the light respectively transmitted through the optical waveguide 2102a and the optical waveguide 2102b. For example, when voltages of +VΠ/2 and −VΠ/2 are applied to the signal electrode 2103A and the signal electrode 2103B respectively, the phase difference between the light transmitted through the optical waveguide 2102a and the optical waveguide 2102b becomes 180°, and the output intensity of the signal light transmitted from the exit optical waveguide 2104 becomes 0.

FIG. 22A illustrates a view of a first example of an optical electric field of each optical waveguide in a conventional optical modulator when both electrical signals in the signal electrode 103A and the signal electrode 103B are ON. In this example, the phase difference between light A transmitted through the optical waveguide 2102a and light B transmitted through the optical waveguide 2102b becomes 180°, and the output intensity of the signal light transmitted from the exit optical waveguide 2104 becomes 0.

FIG. 22B illustrates a view of a second example of an optical electric field of each optical waveguide in the conventional optical modulator when an electrical signal in the signal electrode 103A is ON and an electrical signal in the signal electrode 103B is OFF. In this example, the output intensity of a signal light C transmitted from the exit optical waveguide 2104 is ⅓, and the phase is −71°.

FIG. 22C illustrates a view of a third example of an optical electric field of each optical waveguide in the conventional optical modulator when an electrical signal in the signal electrode 103A is OFF and an electrical signal in the signal electrode 103B is ON. In this example, the output intensity of the signal light C transmitted from the exit optical waveguide 2104 is ⅔, and the phase is +48°.

FIG. 22D illustrates a view of a fourth example of an optical electric field of each optical waveguide in the conventional optical modulator when both electrical signals in the signal electrode 103A and the signal electrode 103B are OFF. In this example, the phase difference between light A transmitted through the optical waveguide 2102a and light B transmitted through the optical waveguide 2102b is 0, the output intensity of the signal light C transmitted from the exit optical waveguide 2104 is 1, and the phase is 0. Combining an input signal to the optical waveguide 2102a with an input signal to the optical waveguide 2102b in this manner enables four values for the output intensity of the signal light C transmitted from the exit optical waveguide 2104.

However, in a conventional optical modulator, since the phase of the signal light C transmitted from the exit optical waveguide varies according to modulation of the intensity, a wavelength chirp occurs in the signal light C, thus changing the wavelength of the signal light C. Therefore, the waveform deteriorates due to wavelength dispersion during transmission causing difficulty with demodulation on the receiving-side.

When intensity modulation by the conventional optical modulator is combined with phase modulation to carry out larger-capacity multi-valued modulation, the phase of the signal light C transmitted from the exit optical waveguide varies according to the intensity modulation, and hence this varying component turns to noise in the phase-modulated signal causing demodulation on the receiving-side to be difficult.

To solve these problems, it is an objective of the present invention to provide an optical modulator that, in generating a multi-valued signal light, reduces wavelength chirp and facilitates demodulation on the receiving-side, and provide a transmitter to which this optical modulator is applied.

SUMMARY OF THE INVENTION

It is an object of the present invention to at least solve the above problems in the conventional technologies.

A Mach-Zehnder type optical modulator according to one aspect of the present invention includes an incident waveguide that branches input light into branched lights; a pair of optical waveguides including a first optical waveguide and a second waveguide that respectively transmit the branched lights and exhibit an electro-optic effect; a pair of signal electrodes including a first signal electrode and a second signal electrode respectively arranged along the pair of optical waveguides; and an exit waveguide that outputs an interfered light of the branched lights transmitted respectively through the pair of optical waveguides; wherein polarizations of the pair of optical waveguides are reversed respectively at a boundary, and any one of a crossing of the first optical waveguide and the second optical waveguide or a crossing of the first signal electrode and the second electrode occurs near the boundary.

A Mach-Zehnder type optical modulator according to another aspect of the present invention includes an incident optical waveguide that receives a light and branches the light a pair of optical waveguides that are formed on a substrate exhibiting an electro-optic effect and respectively transmit the light branched by the incident optical waveguide; a pair of signal electrodes that respectively correspond to the pair of optical waveguides individually and are arranged accordingly along the pair of optical waveguides; and an exit optical waveguide that outputs an interfered light of the light transmitted through the pair of optical waveguides as a signal light; wherein a polarization reversing region where polarization is reversed and a polarization non-reversing region where polarization is not reversed are formed on the substrate by a boundary on the substrate, and correspondences between the pair of signal electrodes and the pair of optical waveguides, switch near the boundary.

A transmitter according to yet another aspect of the present invention includes a Mach-Zehnder type optical modulator.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
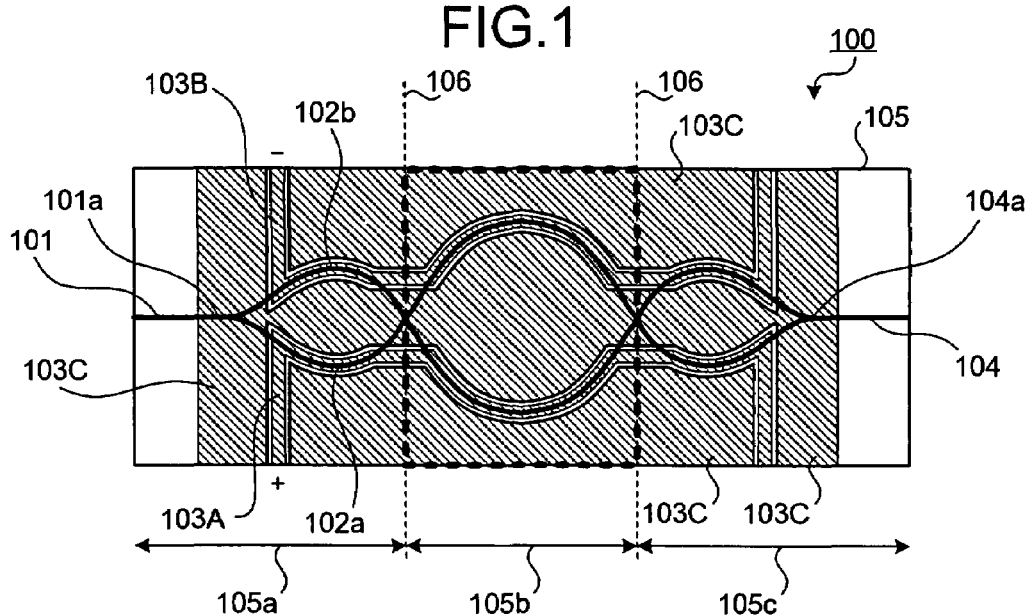
FIG. 1 is a plan view of an optical modulator according to a first embodiment of the present invention.

FIG. 1 is a diagram illustrating a structure of an optical modulator according to a first embodiment. As shown in FIG. 1, an optical modulator 100 according to the first embodiment is a Mach-Zehnder type optical modulator that includes an incident optical waveguide 101, a pair of optical waveguides 102 (an optical waveguide 102a and an optical waveguide 102b), a pair of signal electrodes 103 (a signal electrode 103A and a signal electrode 103B), and an exit optical waveguide 104. The incident optical waveguide 101 receives light and branches the input light at a branch point 101a.

The optical waveguide 102a and the optical waveguide 102b are formed on a substrate 105 having an electro-optic effect, and respectively transmit the light branched by the incident optical waveguide 101. The substrate having the electro-optic effect is a crystal substrate, such as a $LiNbO_3$ or $LiTaO_2$ substrate. The refraction index of the substrate 105 varies depending on a function of the electric field by the signal electrode 103A or the signal electrode 103B. The optical waveguide 102a and the optical waveguide 102b are symmetrically arranged about a straight line connecting the branch point 101a of the incident optical waveguide 101 and an interference point 104a of the exit optical waveguide 104.

A polarization reversing region where polarization is reversed and a polarization non-reversing region where polarization is not reversed are formed on the substrate 105 by a boundary 106 on the substrate 105. In this example, of regions 105a to 105c on the substrate 105 partitioned by each of the boundaries 106, the region 105b is determined as the polarization reversing region (in subsequent drawings, the polarization reversing region is indicated by an area enclosed by a dotted line), and the region 105a and the region 105c are determined as the polarization non-reversing regions. In the polarization reversing region, the direction of a refraction index change effected by an electric field is opposite that in the polarization non-reversing region.

The signal electrode 103A and the signal electrode 103B correspond to the optical waveguide 102a and the optical waveguide 102b, and are arranged along each accordingly. An earth electrode 103C is provided near the signal electrode 103A and the signal electrode 103B. In this example, correspondences of the signal electrode 103A and the signal electrode 103B with respect to the optical waveguide 102a and the optical waveguide 102b are counterchanged at each boundary 106 on the substrate 105.

In this example, the optical waveguide 102a and the optical waveguide 102b cross each other twice, once at each of the boundaries 106. In the region 105a and the region 105c, the signal electrode 103A is arranged along the optical waveguide 102a, and the signal electrode 103B is arranged along the optical waveguide 102b.

On the other hand, in the region 105b, the signal electrode 103A is arranged along the optical waveguide 102b, and the signal electrode 103B is arranged along the optical waveguide 102a. In this manner, when the optical waveguide 102a and the optical waveguide 102b cross each other at each of the boundaries 106, the correspondences of the signal electrode 103A and the signal electrode 103B with respect to the optical waveguide 102a and the optical waveguide 102b are counterchanged.

Two-valued electrical signals (micro waves) flow through the signal electrode 103A and the signal electrode 103B to apply electric fields to the optical waveguide 102a and the optical waveguide 102b respectively, thereby changing refraction indexes of the optical waveguide 102a and the optical waveguide 102b. Control of the electrical signals flowing through the signal electrode 103A and the signal electrode 103B enables the phases of the light respectively transmitted through the optical waveguide 102a and the optical waveguide 102b to be changed. In this example, a positive electrical signal flows through the signal electrode 103A and a negative electrical signal flows through the signal electrode 103B.

The exit optical waveguide 104 outputs an interfered light of the respective lights transmitted through the optical waveguide 102a and the optical waveguide 102b as a signal light. This signal light is an intensity modulated signal whose intensity differs depending on the phase difference between the respective lights transmitted through the optical waveguide 102a and the optical waveguide 102b.

Of the incident optical waveguide 101, the pair of optical waveguides 102a and 102b, and the exit optical waveguide 104, the pair of optical waveguides 102a and 102b alone may have the electro-optic effect. However, in this example, the incident optical waveguide 101, the pair of optical waveguides 102a and 102b, and the exit optical waveguide 104 are all formed in the same crystal substrate 105 having the electro-optic effect and the signal electrode 103A and the signal electrode 103B are arranged on the surface of this substrate.

A buffer layer may be provided between the substrate 105 and the signal electrode 103A, the substrate 105 and signal electrode 103B, and the substrate 105 and the earth electrode 103C to prevent light transmitted through the optical waveguides 102 and the exit optical waveguide 104 from being absorbed by the signal electrodes 103A, 103B or the earth electrode 103C. For example, silicon dioxide having a thickness of 0.2 to 1 micrometer may be used for the buffer layer. Changing cross-sectional shapes of the signal electrode 103A and the signal electrode 103B enables control of the effective refraction index of the electrical signals, and by the matching of light and electrical signal velocities, optical response characteristics of a wide band can be obtained.

The polarization reversing region is formed by patterning the substrate 105 with, for example, a resist followed by application of a pulse high electric field. When crossing the optical waveguide 102a and the optical waveguide 102b, leakage of light from one optical waveguide to the other must be avoided as much as possible. Therefore, crossing the optical waveguide 102a and the optical waveguide 102b at a substantially right angle is preferred.

Figure 2A:
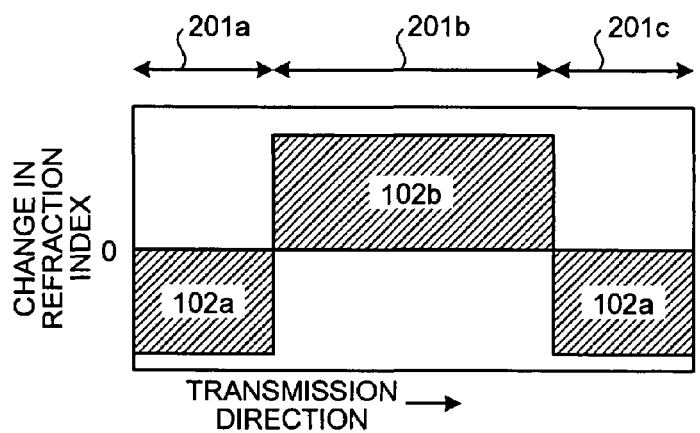
FIG. 2A is a view of a change in a refractive factor of a direct current (DC) component caused by a signal electrode 103A in a pair of optical waveguides in the optical modulator according to the first embodiment.
Figure 2B:
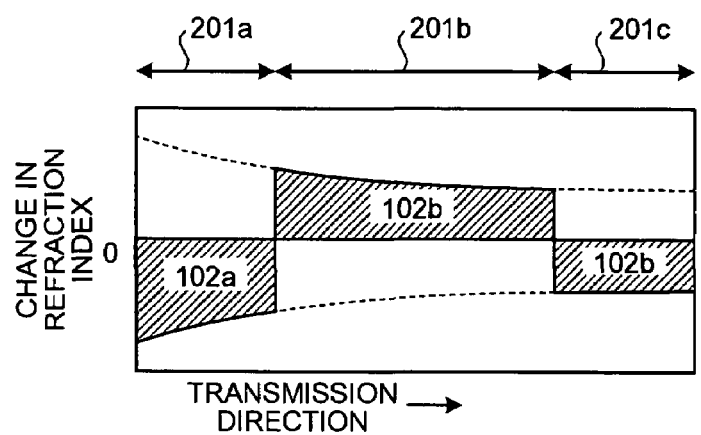
FIG. 2B is a view of a change in a refractive factor of a high-frequency component caused by the signal electrode 103A.
Figure 2C:
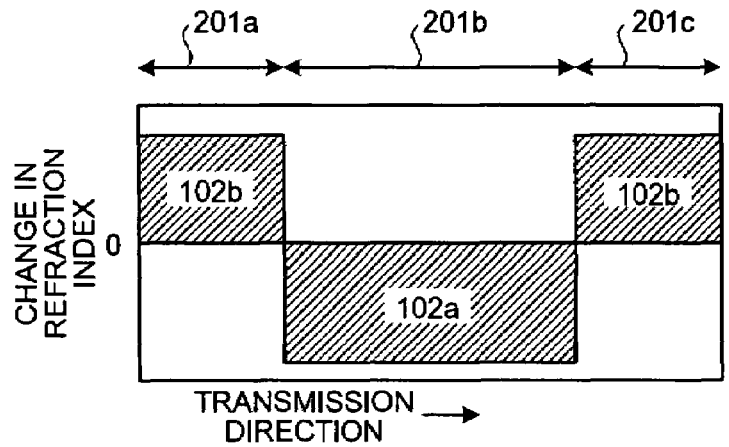
FIG. 2C is a view of a change in a refractive factor of a DC component caused by a signal electrode 103B in a pair of optical waveguides in the optical modulator according to the first embodiment.
Figure 2D:
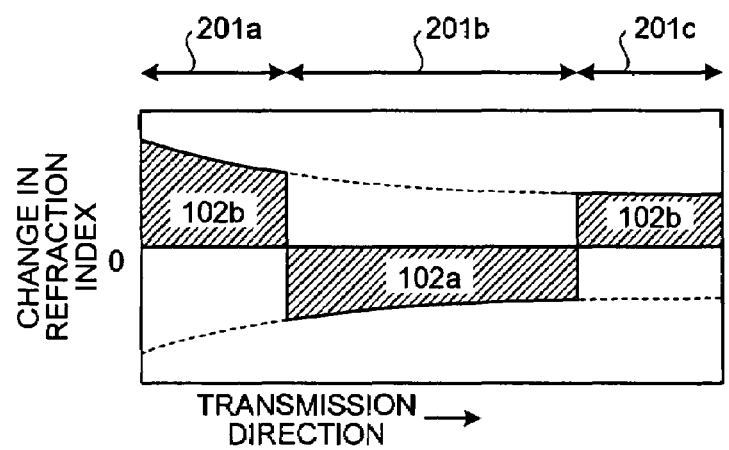
FIG. 2D is a view of a change in a refractive factor of a high-frequency component caused by the signal electrode 103B.

FIG. 2A is a view of a change in a refraction index of a DC component caused by the signal electrode 103A in the pair of optical waveguides in the optical modulator according to the first embodiment. FIG. 2B is a view of a change in a refraction index of a high-frequency component caused by the signal electrode 103A in the pair of optical waveguides in the optical modulator according to the first embodiment. FIG. 2C is a view of a change in a refraction index of a DC component caused by the signal electrode 103B in the pair of optical waveguides in the optical modulator according to the first embodiment. FIG. 2D is a view of a change in a refraction index of a high-frequency component caused by the signal electrode 103B in the pair of optical waveguides in the optical modulator according to the first embodiment.

In each of FIGS. 2A to 2D, the abscissa represents the direction of light in the optical waveguide 102a and the optical waveguide 102b, and the ordinate represents changes in the refraction index in the optical waveguide 102a and the optical waveguide 102b. Regions 201a to 201c correspond to the regions 105a to 105c depicted in FIG. 1, respectively. As shown in FIGS. 2B and 2D, since a high-frequency component is attenuated every time it is transmitted through the optical waveguide, an absolute value of a change in refraction index decreases in the direction of transmission.

As shown in FIGS. 2A and 2B, a positive current flowing through the signal electrode 103A changes a refraction index of the optical waveguide 102a into a negative value in the region 201a and the region 201c, and changes a refraction index of the optical waveguide 102b into a positive value in the region 201b. On the other hand, as shown in FIGS. 2C and 2D, a negative current flowing through the signal electrode 103B changes the refraction index of the optical waveguide 102b into a positive value in the region 201a and the region 201c, and changes the refraction index of the optical waveguide 102a into a negative value in the region 201b.

Refraction index changes in the optical waveguide 102a and the optical waveguide 102b into a positive value and a negative value in the regions 201a and 201c which are the polarization non-reversing regions are opposite to that in the region 201b which is the polarization reversing region. The ratio of the lengths of segments of the optical waveguide 102a and the optical waveguide 102b interacting with the signal electrode 103A or the signal electrode 103B in the regions 201a and 201c, and the region 201b, is adjusted in such a manner that the absolute value of the change in refraction index in the regions 201a and 201c becomes equal to that in the region 201b.

Figure 3A:
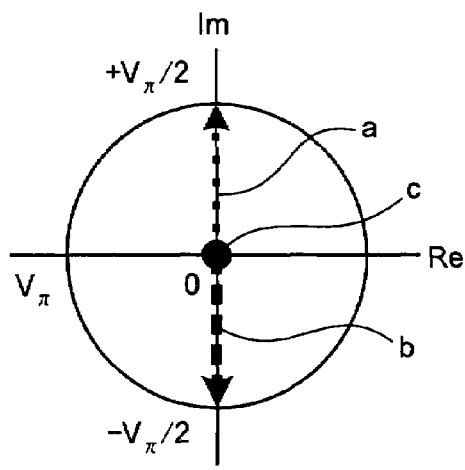
FIG. 3A is a view of a first example of an optical electric field of each optical waveguide in the optical modulator according to the first embodiment.

FIG. 3A illustrates a first example of an optical electric field of each optical waveguide in the optical modulator according to the first embodiment when electrical signals in both the signal electrode 103A and the signal electrode 103B are ON. In this example, an output intensity of light A transmitted through the optical waveguide 102a is equal to that of light B transmitted through the optical waveguide 102b, and a phase difference is 180°. Therefore, the output intensity of the signal light C transmitted from the exit optical waveguide 104 is 0.

Figure 3B:
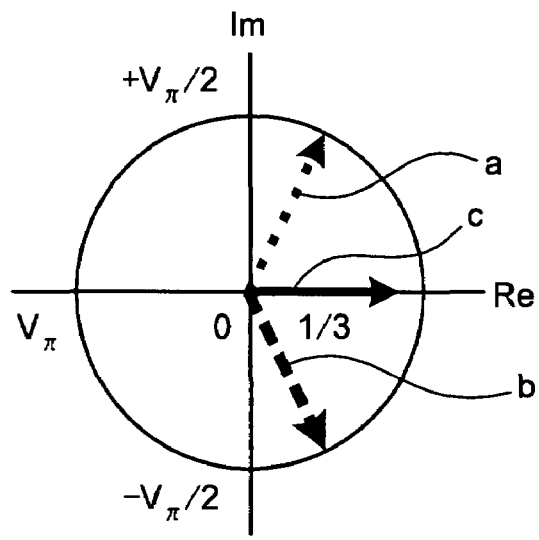
FIG. 3B is a view of a second example of an optical electric field of each optical waveguide in the optical modulator according to the first embodiment.

FIG. 3B illustrates a second example of an optical electric field of each optical waveguide in the optical modulator according to the first embodiment when an electrical signal in the signal electrode 103A is ON and an electrical signal in the signal electrode 103B is OFF. In this example, the output intensity of light A transmitted through the optical waveguide 102a is equal to that of light B transmitted through the optical waveguide 102b, phases of these lights are opposite to each other in sign, and the absolute values are equal to each other. Therefore, the phase of signal light C transmitted from the exit optical waveguide 104 is 0. The output intensity of the signal light C is 1/3.

Figure 3C:
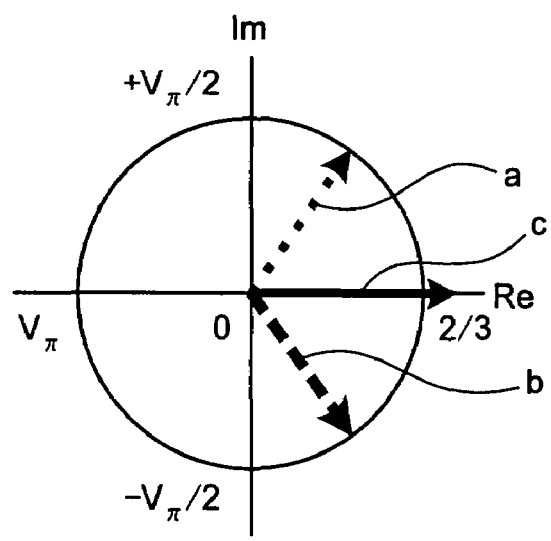
FIG. 3C is a view of a third example of an optical electric field of each optical waveguide in the optical modulator according to the first embodiment.

FIG. 3C illustrates a third example of an optical electric field of each optical waveguide in the optical modulator according to the first embodiment when an electrical signal in the signal electrode 103A is OFF and an electrical signal in the signal electrode 103B is ON. In this example, likewise, the output intensity of light A transmitted through the optical waveguide 102a is equal to that of light B transmitted through the optical waveguide 102b, phases of these lights are opposite to each other in sign, and the absolute values are equal to each other. Therefore, the phase of signal light C transmitted from the exit optical waveguide 104 is 0. The output intensity of the signal light C is 2/3.

Figure 3D:
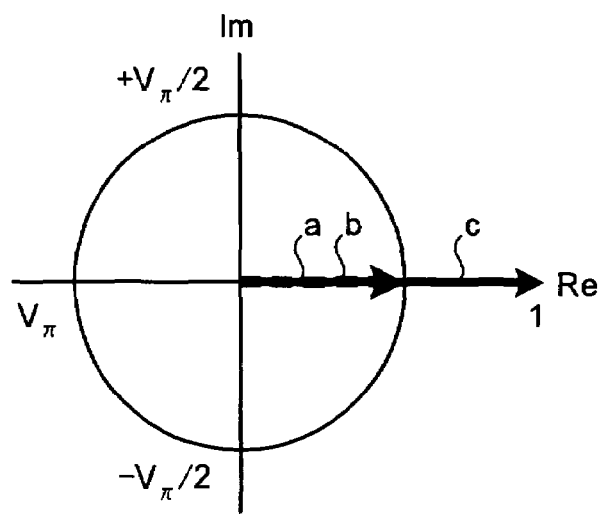
FIG. 3D is a view of a fourth example of an optical electric field of each optical waveguide in the optical modulator according to the first embodiment.

FIG. 3D illustrates a fourth example of an optical electric field of each optical waveguide in the optical modulator according to the first embodiment when electrical signals in both the signal electrodes 103A and the signal electrode 103B are OFF. In this example, the output intensity of light A transmitted through the optical waveguide 102a is the same as that of light B transmitted through the optical waveguide 102b, and phases of these lights are 0. Therefore, the phase of signal light C transmitted from the exit optical waveguide 104 is 0. The output intensity of the signal light C is 1.

Figure 4:
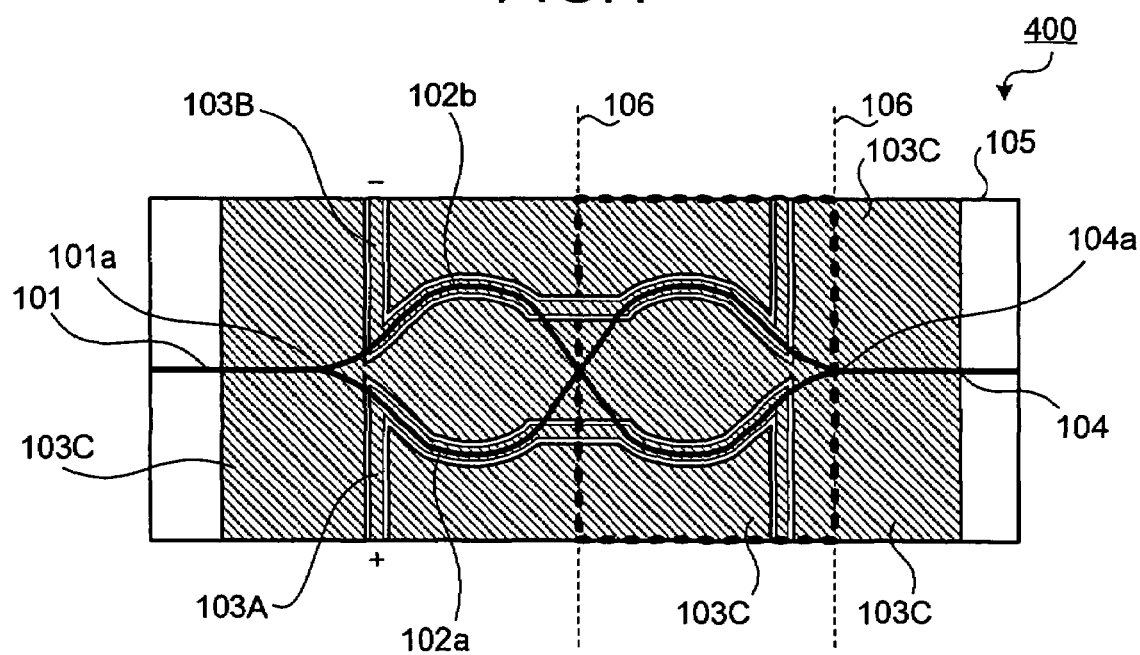
FIG. 4 is a plan view of an optical modulator according to a first modification of the first embodiment.

FIG. 4 is a diagram illustrating a structure of an optical modulator according to a first modification of the first embodiment. As shown in FIG. 4, the optical waveguide 102a and the optical waveguide 102b in an optical modulator 400 according to the first modification of the first embodiment cross each other once at the boundary 106. Of portions of the optical waveguide 102a and the optical waveguide 102b interacting with the signal electrode 103A and the signal electrode 103B, the portion in a polarization reversing region and the portion in a polarization non-reversing region have the same length. As a result, the phase of signal light C transmitted from the exit optical waveguide 104 does not vary with each output intensity.

Figure 5:
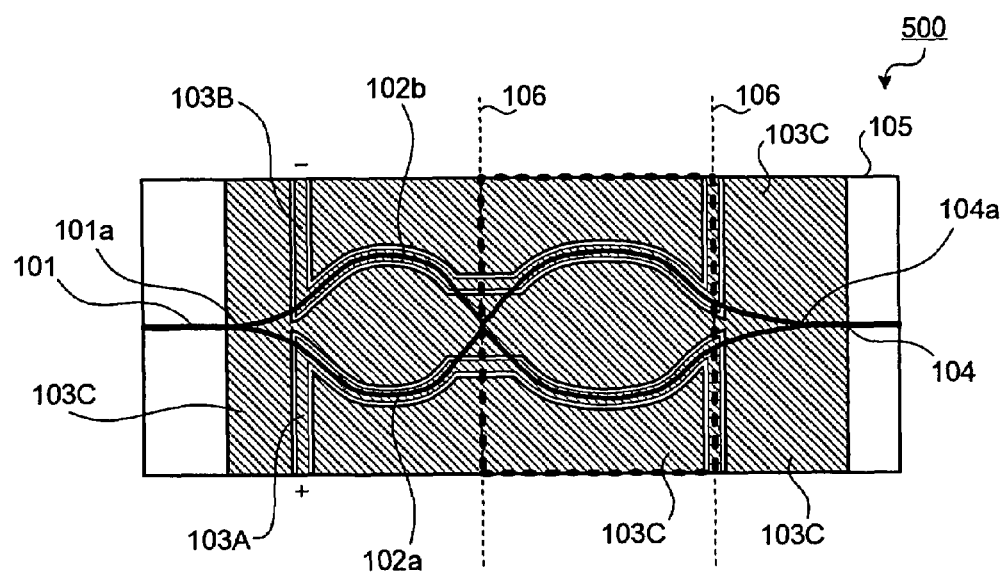
FIG. 5 is a plan view of an optical modulator according to a second modification of the first embodiment.

FIG. 5 is a diagram illustrating a structure of an optical modulator according to a second modification of the first embodiment. As shown in FIG. 5, an optical waveguide 102a and an optical waveguide 102b in an optical modulator 500 according to the second modification of the first embodiment cross each other once at the boundary 106. Of the segments of the optical waveguide 102a and the optical waveguide 102b interacting with the signal electrode 103A and the signal electrode 103B, the segment extending from the boundary 106 toward the exit optical waveguide 104 is longer than the segment extending from the boundary 106 toward the incident optical waveguide 101.

As a result, the phase of a high-frequency component of signal light C that is attenuated every time it is transmitted through the optical waveguide 102a and the optical waveguide 102b does not vary with each output intensity. Furthermore, either one of the regions extending from the boundary 106 toward the incident optical waveguide 101 or from the boundary 106 toward the exit optical waveguide 104 on the substrate 105 may be a polarization reversing region.

Figure 6:
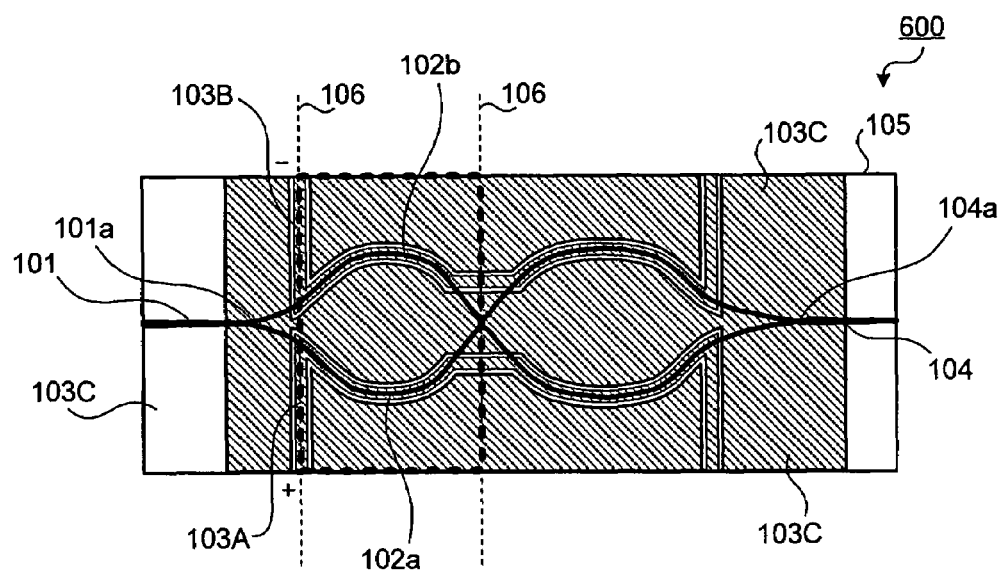
FIG. 6 is a plan view of an optical modulator according to a third modification of the first embodiment.

FIG. 6 is a diagram illustrating a structure of an optical modulator according to a third modification of the first embodiment. As shown in FIG. 6, an optical modulator 600 according to the third modification of the first embodiment has a structure of the optical modulator 500 according to the second modification of the first embodiment where a region extending from the boundary 106 toward the incident optical waveguide 101 on the substrate 105 is a polarization reversing region. As a result, the phase of a high-frequency component of signal light C does not vary with respect to each output intensity, and the area of the polarization reversing region is narrow, thus facilitating polarization reversing.

Figure 7:
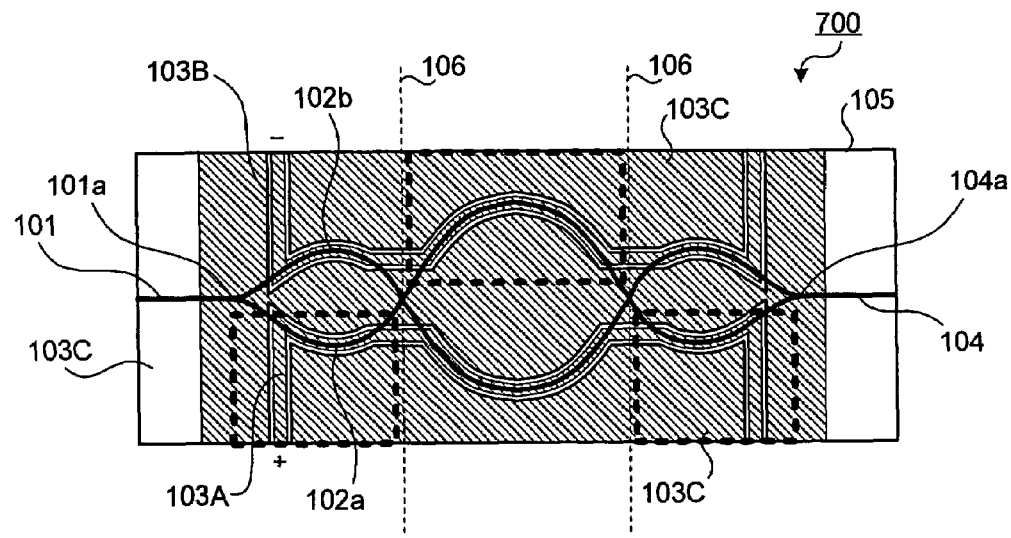
FIG. 7 is a plan view of an optical modulator according to a fourth modification of the first embodiment.

FIG. 7 is a diagram of a structure of an optical modulator according to a fourth modification of the first embodiment. As shown in FIG. 7, the optical waveguide 102a and the optical waveguide 102b in an optical modulator 700 according to the fourth modification of the first embodiment cross each other twice at each of the boundaries 106. The segments of the optical waveguide 102a interacting with the signal electrode 103A or the signal electrode 103B are entirely provided in a polarization reversing region on the substrate 105.

On the other hand, the segments of the optical waveguide 102b interacting with the signal electrode 103A or the signal electrode 103B are entirely provided in a polarization nonreversing region on the substrate 105. As a result, both electrical signals flowing through the signal electrode 103A and the signal electrode 103B can be positive electrical signals.

Figure 8:
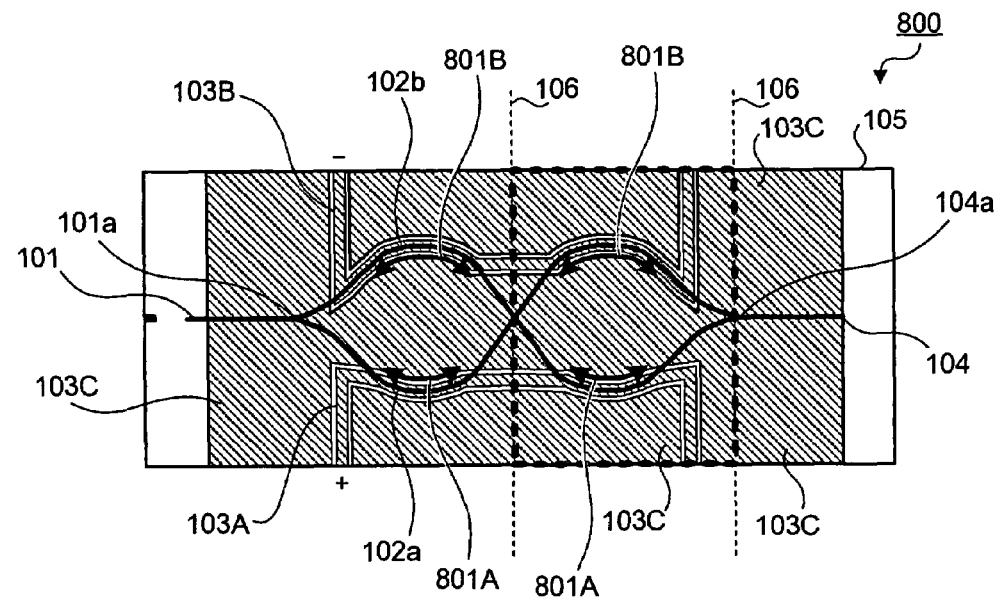
FIG. 8 is a plan view of an optical modulator according to a fifth modification of the first embodiment.

FIG. 8 is a diagram illustrating a structure of an optical modulator according to a fifth modification of the first embodiment. As shown in FIG. 8, in an optical modulator 800 according to the fifth modification of the first embodiment, an interacting segment 801A of the optical waveguide 102a and the optical waveguide 102b with respect to the signal electrode 103A has a length different from that of an interacting segment 801B of the optical waveguide 102a and the optical waveguide 102b with respect to the signal electrode 103B.

In this example, the optical waveguide 102a and the optical waveguide 102b are symmetrically arranged and the signal electrode 103A and the signal electrode 103B are asymmetrically formed about a straight line connecting the branch point 101a of the incident optical waveguide 101 with the interference point of an exit optical waveguide 104. As a result, even if the voltage of an electrical signal flowing through the signal electrode 103A is the same as that of an electrical signal flowing through the signal electrode 103B, phase variation in the optical waveguide 102a is different from that in the optical waveguide 102b, and hence the optical modulator 800 can produce a four-valued signal.

Further, the thickness of a buffer layer where the signal electrode 103A is arranged and the thickness of a buffer layer where the signal electrode 103B is arranged in a substrate 105 may be changed to realize a structure where the phase variation in the optical waveguide 102a is different from that in the optical waveguide 102b even if the voltage of an electrical signal flowing through the signal electrode 103A is the same as that flowing through the signal electrode 103B. Moreover, the gap, i.e., distance, between the signal electrode 103A and the earth electrode 103C respectively provided nearby may be different from the gap between the signal electrode 103B and the earth electrode 103C respectively provided nearby.

Figure 9:
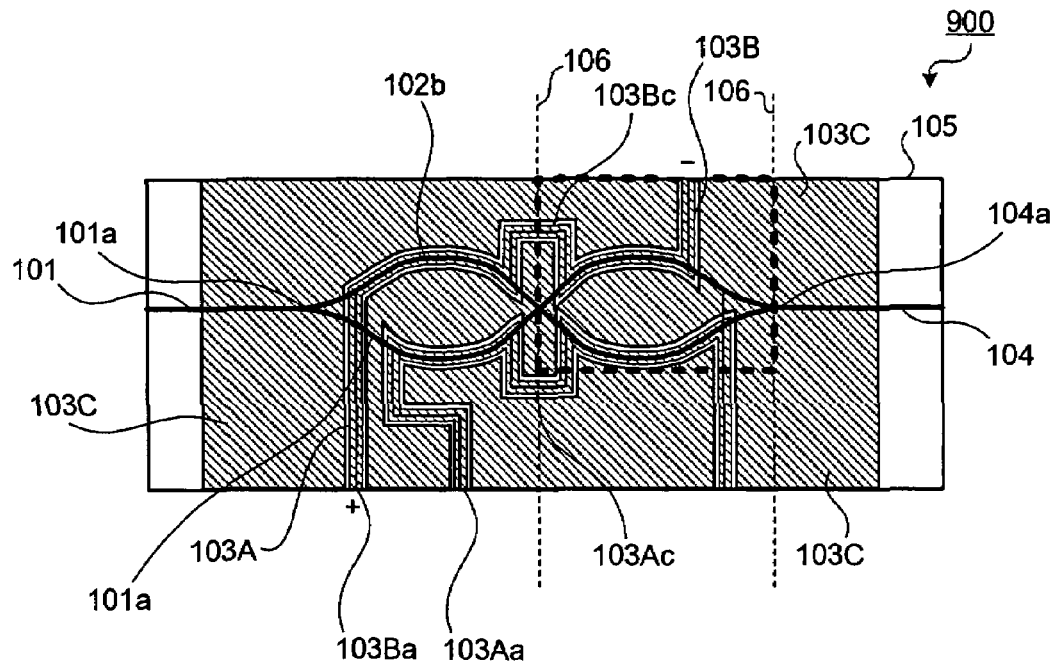
FIG. 9 is a plan view of an optical modulator according to a sixth modification of the first embodiment.

FIG. 9 is a diagram illustrating a structure of an optical modulator according to a sixth modification of the first embodiment. As shown in FIG. 9, both an electrode pad 103Aa of the signal electrode 103A and an electrode pad 103Ba of the signal electrode 103B in an optical modulator 900 according to the sixth modification of the first embodiment are provided to be led out to one side of the substrate 105. As a result, when applying the optical modulator 900 to a transmitter, accommodation properties of the optical modulator 900 with respect to the transmitter can be improved.

The length of the signal electrode 103A from the electrode pad 103Aa to the optical waveguide 102a is equal to the length of the signal electrode 103B from the electrode pad 103Ba to the optical waveguide 102b. Specifically, the signal electrode 103A has a detour portion 103Ab between the optical waveguide 102a and the electrode pad 103Aa. As a result, the timing when an electrical signal input to the electrode pad 103Aa acts on the optical waveguide 102a can be matched with the timing when an electrical signal input to the electrode pad 103Ba acts on the optical waveguide 102b.

The signal electrode 103A and the signal electrode 103B have a detour 103Ac and a detour 103Bc at a position of the boundary 106, respectively. As a result, a deviation in timing between transmitted light and an electrical signal can be avoided in the optical waveguide 102a and the optical waveguide 102b.

Figure 10:
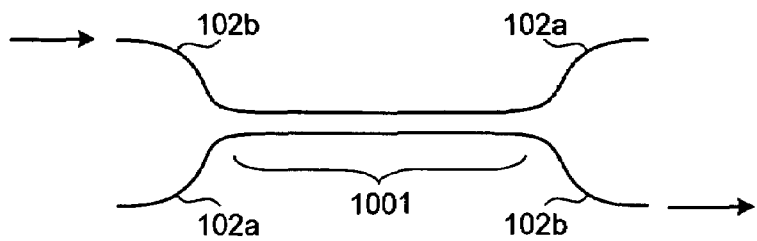
FIG. 10 is a view of a first example of a crossing of the pair of waveguides in the optical modulator according to the first embodiment.

FIG. 10 is a view of a first example of a crossing of a pair of waveguides in an optical modulator according to the first embodiment. As shown in FIG. 10, a directional coupler 1001 constitutes a crossing of the optical waveguide 102a and the optical waveguide 102b in the optical modulator (e.g., the optical modulator 100) according to the first embodiment. As explained above, crossing the optical waveguide 102a and the optical waveguide 102b at a substantially right angle is preferred to avoid cross-leakage of light into each waveguide as much as possible. However, the directional coupler 1001 can be used when a chip is narrow and a sufficient crossing angle cannot be obtained.

Figure 11:
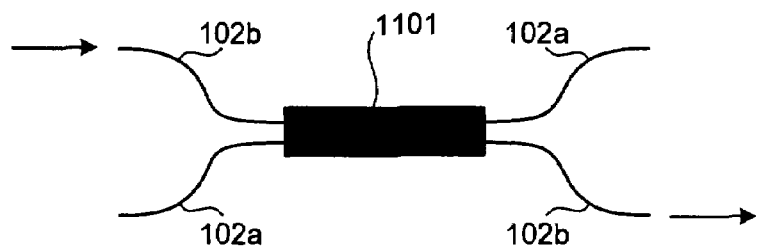
FIG. 11 is a view of a second example of a crossing of the pair of waveguides in the optical modulator according to the first embodiment.

FIG. 11 is a view of a second example of a crossing of a pair of waveguides in an optical modulator according to the first embodiment. As shown in FIG. 11, a multimode interference (MMI) coupler 1101 may constitute a crossing of the optical waveguide 102a and the optical waveguide 102b of an optical modulator (e.g., the optical modulator 100) according to the first embodiment.

Figure 12:
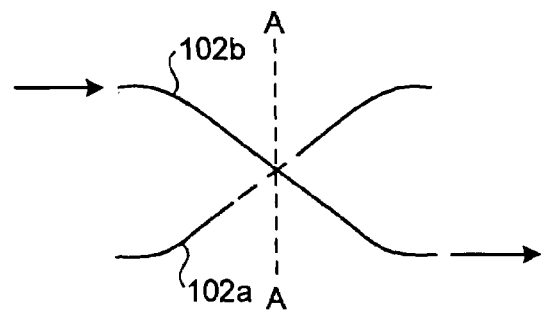
FIG. 12 is a view of a third example of a crossing of the pair of waveguides in the optical modulator according to the first embodiment.
Figure 13:
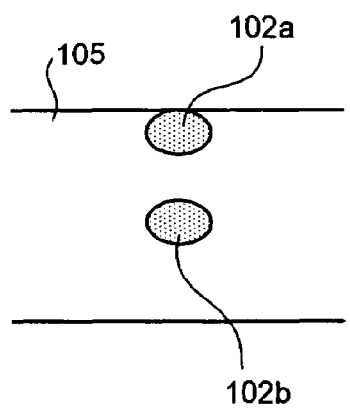
FIG. 13 is a cross-sectional view taken along A-A in FIG. 12.

FIG. 12 is a view of a third example of a crossing of a pair of waveguides in an optical modulator according to the first embodiment. FIG. 13 is a cross-sectional view taken along A-A depicted in FIG. 12. As shown in FIGS. 12 and 13, a crossing of the optical waveguide 102a and the optical waveguide 102b in an optical modulator (e.g., the optical modulator 100) according to the first embodiment may be a multilevel crossing realized when these waveguides cross each other at upper and lower positions in the substrate 105. In this example, the optical waveguide 102b is provided in the substrate 105 by, for example, a method of applying a short pulse laser to increase the refraction index in the substrate 105.

Figure 14:
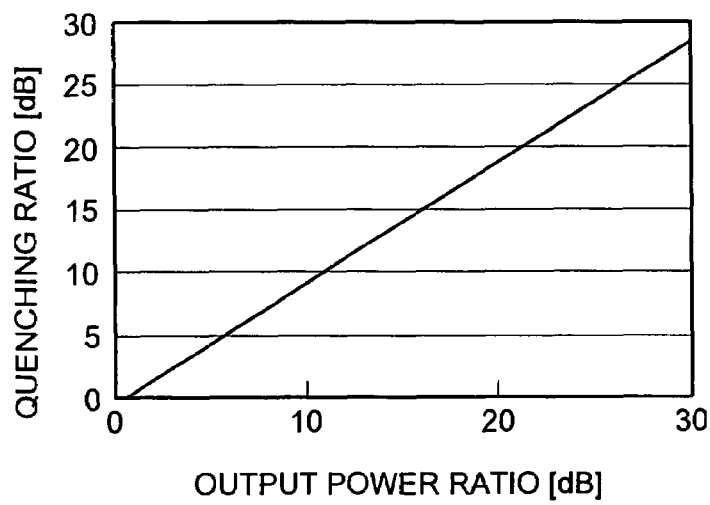
FIG. 14 is a graph of a relationship between an output power ratio and a quenching ratio.

FIG. 14 is a graph of output power ratio and quenching ratio. In FIG. 14, the abscissa represents an output power ratio and the ordinate represents a quenching ratio in decibels. Since approximately 13 decibels or above are required as the quenching ratio of the modulator, configuration of the output power ratio to become 15 decibels or above is preferred.

According to the optical modulator 100 of the first embodiment, when the optical waveguide 102a crosses the optical waveguide 102b at the boundary 106, correspondences of the signal electrode 103A and the signal electrode 103B with respect to the optical waveguide 102a and the optical waveguide 102b are counterchanged, thus varying the output intensity without changing the phase of signal light C transmitted from the exit optical waveguide 104. Therefore, wavelength chirp does not occur, and a multi-valued signal light C that can be readily demodulated on a receiver-side can be generated.

Figure 15:
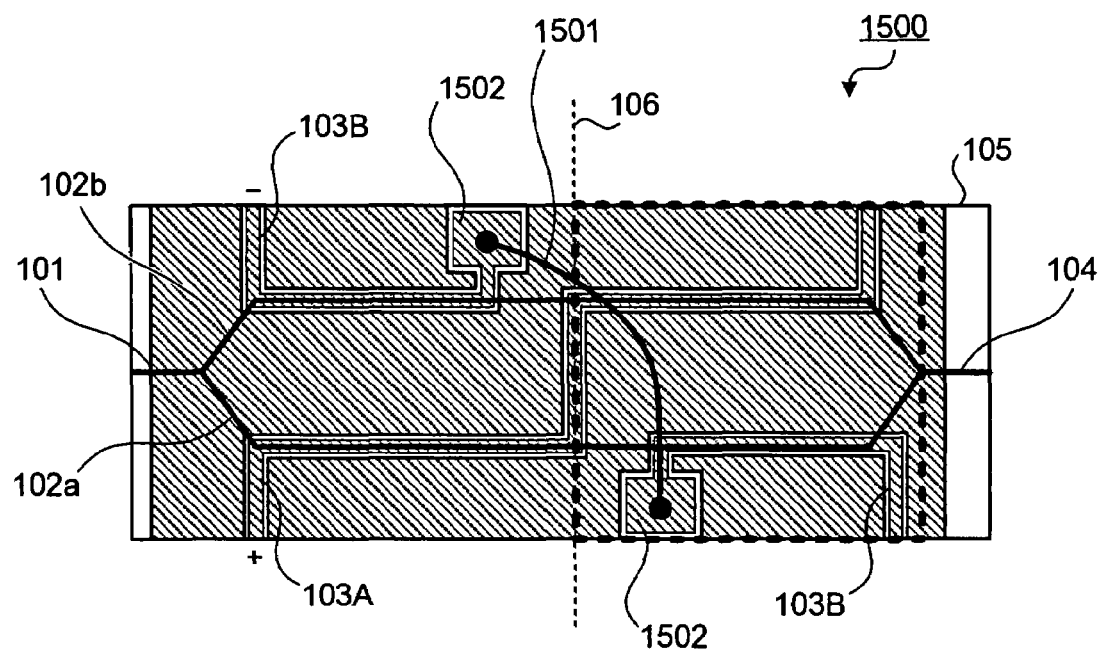
FIG. 15 is a plan view of an optical modulator according to a second embodiment.

FIG. 15 is a diagram illustrating a structure of an optical modulator according to a second embodiment. As shown in FIG. 15, in an optical modulator 1500 according to the second embodiment, since the signal electrode 103A and the signal electrode 103B cross each other three-dimensionally at the boundary 106, correspondences of the signal electrode 103A and the signal electrode 103B with respect to the optical waveguide 102a and the optical waveguide 102b are counterchanged.

In this example, at the boundary 106, a portion of the signal electrode 103B is formed by a wire 1501, and the wire 1501 crosses the signal electrode 103A three-dimensionally. However, the wire 1501 does not necessarily have to cross the signal electrode 103A at the boundary 106, and positions of the polarization reversing region and the crossing of the wire 1501 can be determined corresponding to a degree of wavelength chirp. Electrode pads 1502 to which the wire 1501 is bonded are provided at both ends of the wire 1501, thereby improving workability.

Figure 16:
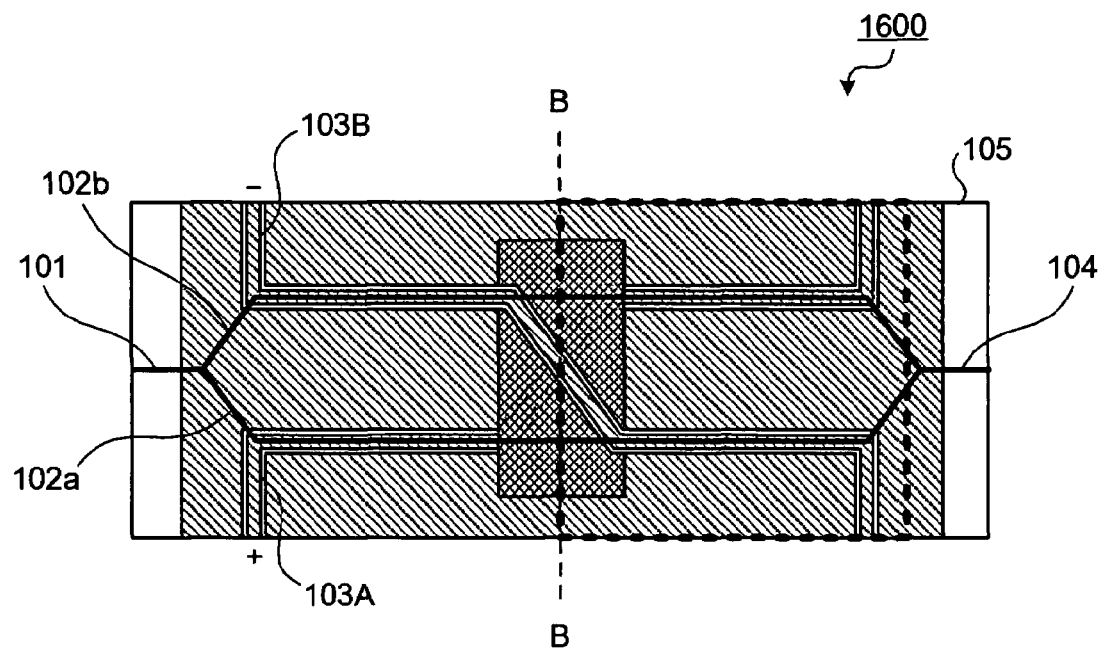
FIG. 16 is a plan view of an optical modulator according to a modification of the second embodiment.
Figure 17A:
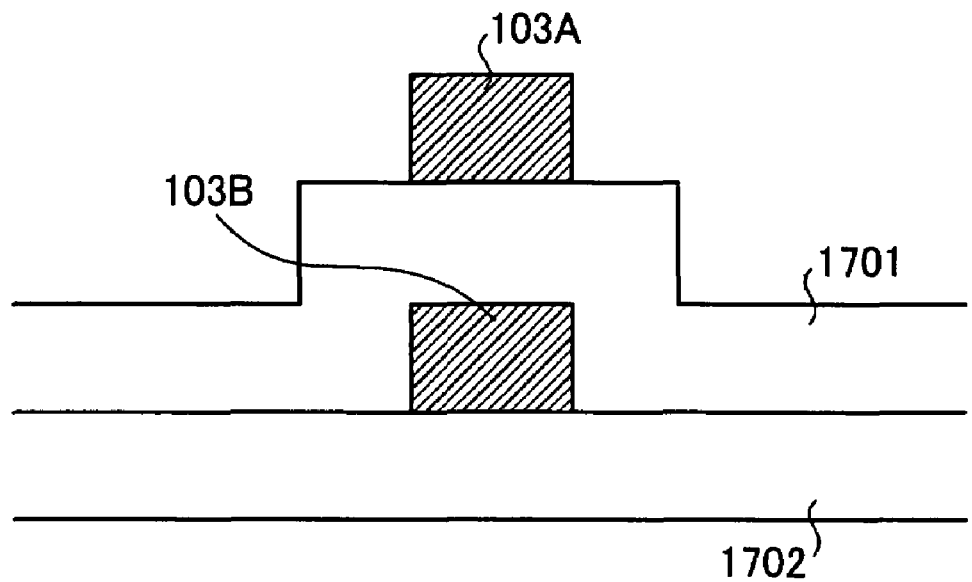
FIG. 17A is a first example of a cross-sectional view taken along B-B in FIG. 16.
Figure 17B:
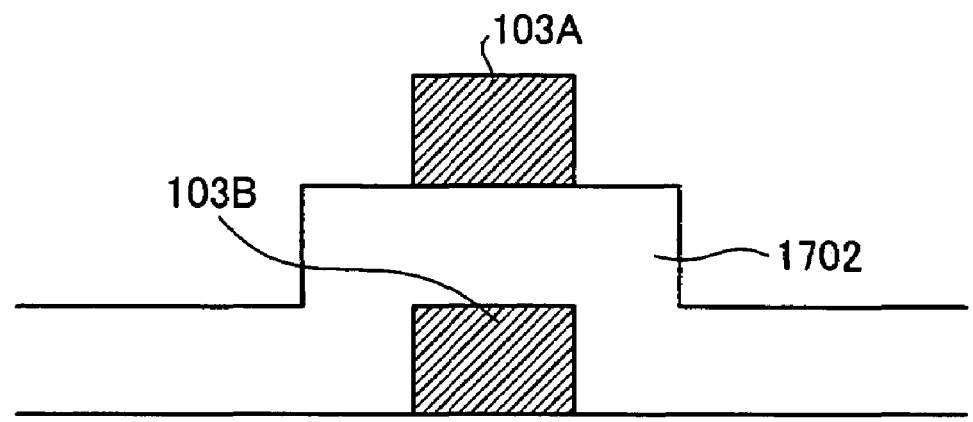
FIG. 17B is a second example of a cross-sectional view taken along B-B in FIG. 16.

FIG. 16 is a diagram illustrating a structure of an optical modulator according to a modification of the second embodiment. FIG. 17A is a first example of a cross-sectional view taken along B-B in FIG. 16. FIG. 17B is a second example of a cross-sectional view taken along B-B in FIG. 16. As shown in FIG. 16, the signal electrode 103A and the signal electrode 103B in an optical modulator 1600 according to the second embodiment may three-dimensionally cross each other at the boundary 106 by being arranged in multiple layers at a position of the boundary 106. However, the signal electrode 103A and the signal electrode 103B do not necessarily have to cross at the boundary 106, and positions of the polarization reversing region and the crossing of the signal electrode 103A and the signal electrode 103B can be determined corresponding to a degree of wavelength chirp.

For example, as shown in FIG. 17A, the signal electrode 103A and the signal electrode 103B may three-dimensionally cross each other at the boundary 106 by being arranged in multiple layers through an insulating layer 1701. As shown in FIG. 17B, the signal electrode 103A and the signal electrode 103B may be arranged in multiple layers in a buffer layer 1702 in the substrate 105. As a result, the signal electrode 103A and the signal electrode 103B can three-dimensionally cross each other without forming a film of the insulating layer 1701 in particular.

According to the optical modulator of the second embodiment, when the signal electrode 103A and the signal electrode 103B three-dimensionally cross each other at the boundary 106, correspondences of the signal electrode 103A and the signal electrode 103B with respect to the optical waveguide 102a and the optical waveguide 102b are counterchanged, and an output intensity can be changed without varying the phase of signal light C transmitted from the exit optical waveguide 104. Therefore, wavelength chirp does not occur, and a multi-valued signal light C that can be readily demodulated on a receiver-side can be generated.

Figure 18:
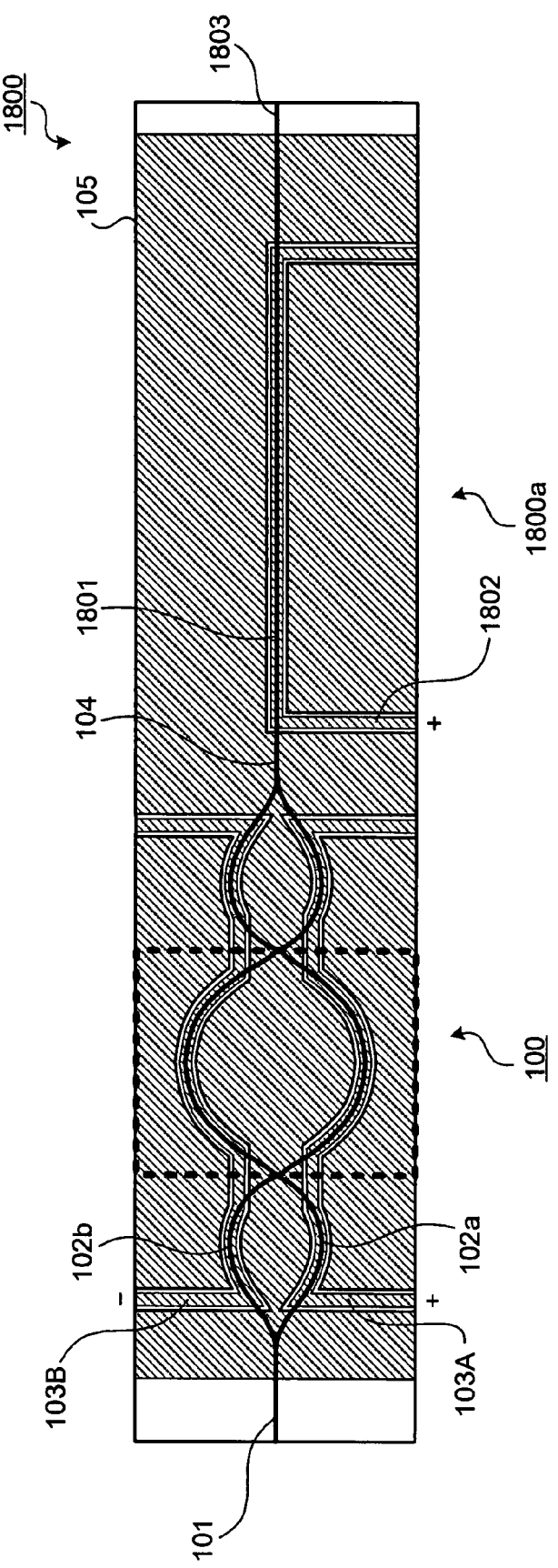
FIG. 18 is a plan view of an optical modulator according to a third embodiment.

FIG. 18 is a diagram illustrating a structure of an optical modulator according to a third embodiment. As shown in FIG. 18, an optical modulator 1800 according to the third embodiment further includes a phase modulator 1800a that performs two-valued phase modulation with respect to signal light transmitted from the exit optical waveguide 104. In this example, the phase modulator 1800a is formed on the substrate 105 having the optical modulator 100 formed therein, and includes an optical waveguide 1801, a signal electrode 1802, and an exit optical waveguide 1803.

The optical waveguide 1801 transmits the signal light C transmitted from the exit optical waveguide 104 in the phase modulator 100. The signal electrode 1802 is arranged in parallel with the optical waveguide 1801. The exit optical waveguide 1803 transmits the light transmitted through the optical waveguide 1801 as signal light. The optical modulator 1800 controls the electrical signal in the signal electrode 1802 to change the phase of the light transmitted through the optical waveguide 1801, thereby effecting two-valued phase modulation.

Figure 19:
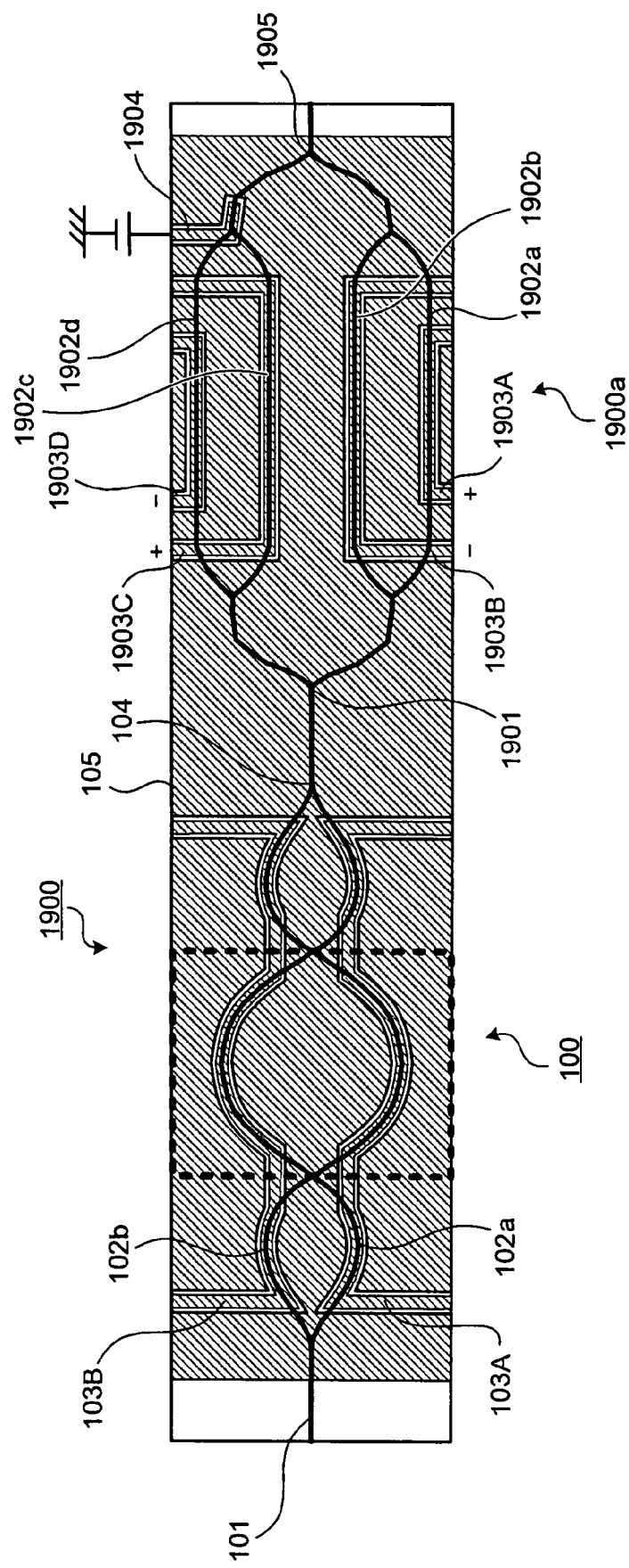
FIG. 19 is a plan view of an optical modulator according to a modification of the third embodiment.

FIG. 19 is a diagram illustrating a structure of an optical modulator according to a modification of the third embodiment. As shown in FIG. 19, an optical modulator 1900 according to the third embodiment further includes a phase modulator 1900a that performs four-valued phase modulation with respect to signal light transmitted from the exit optical waveguide 104. In this example, the phase modulator 1900a is formed on the substrate 105 having the optical modulator 100 formed therein, and includes a branching optical waveguide 1901, two pairs of optical waveguides 1902a to 1902d, two pairs of signal electrodes 1903A to 1903D, an earth electrode 1904, and an exit optical waveguide 1905.

The branching optical waveguide 1901 divides signal light C transmitted from the exit optical waveguide 104 of the phase modulator 100 into four directions. The two pairs of optical waveguides 1902 (the optical waveguides 1902a to 1902d) transmit the signal light C divided into four directions by the branching optical waveguide 1901. The two pairs of signal electrodes 1903 (the signal electrodes 1903A to 1903D) respectively correspond to and are accordingly arranged along the optical waveguides 1902a to 1902d.

The electrode 1904 biases each light transmitted through the optical waveguides 1902c and 1902d by $V_\pi/2$. The exit optical waveguide 1905 outputs an interfered light of the light transmitted through the two pairs of optical waveguides 1902 as signal light. The optical modulator 1900 controls the electrical signals in the signal electrodes 1903A to 1903D to change the phase of the respective lights transmitted through the optical waveguides 1902a to 1902d, thereby effecting four-valued phase modulation.

Here, the phase modulator 1800a and the phase modulator 1900a are formed on the substrate 105 having the optical modulator 100 formed therein in FIGS. 18 and 19. However, each of these phase modulators may be formed in combination with a module different from the optical modulator 100. Furthermore, the phase modulation mode is not restricted to that described hereinbefore. Examples in which the optical modulator 100 is applied to the optical modulator 1800 and the optical modulator 1900 are described above. However, the optical modulator is not restricted thereto, and the optical modulator according to any of the aforementioned embodiments can be applied.

According to the optical modulator 1800 and the optical modulator 1900 according to the third embodiment, when intensity modulation of light further combined with phase modulation, noise due to phase modulation can be reduced because the phase of signal light obtained by intensity modulation does not vary. As a result, according to the optical modulator 1800 or the optical modulator 1900, high-capacity multi-valued signal light that can be readily demodulated on a receiving-side can be generated.

Figure 20:
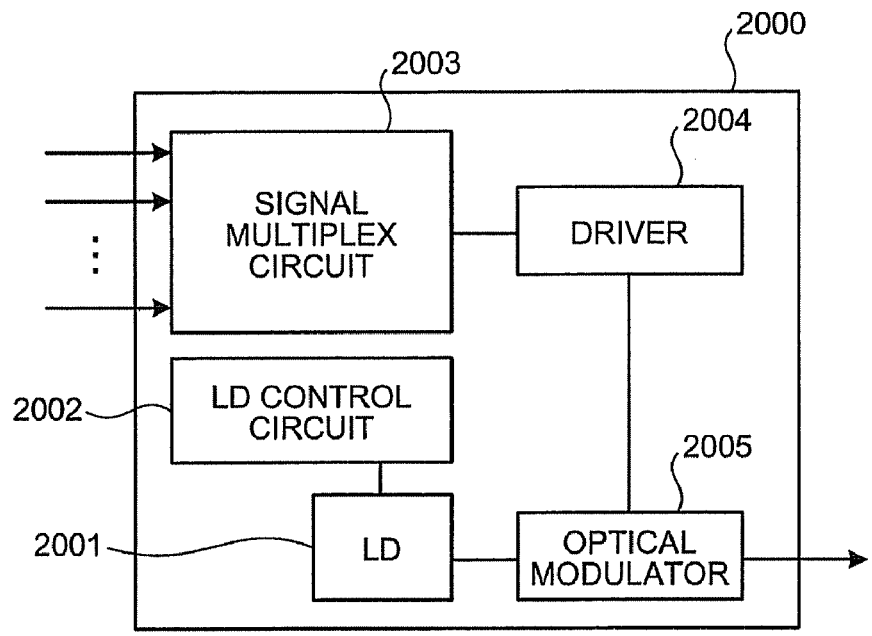
FIG. 20 is a block diagram of an example of a transmitter to which the optical modulator according to the present invention is applied.
Figure 21:
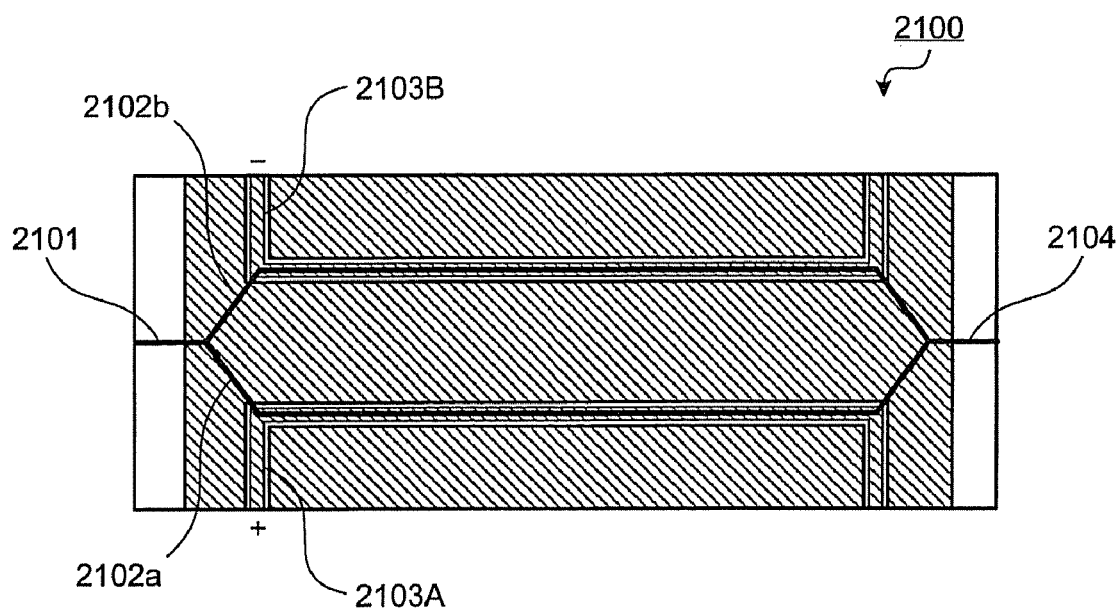
FIG. 21 is a plan view of a conventional optical modulator.
Figure 22A:
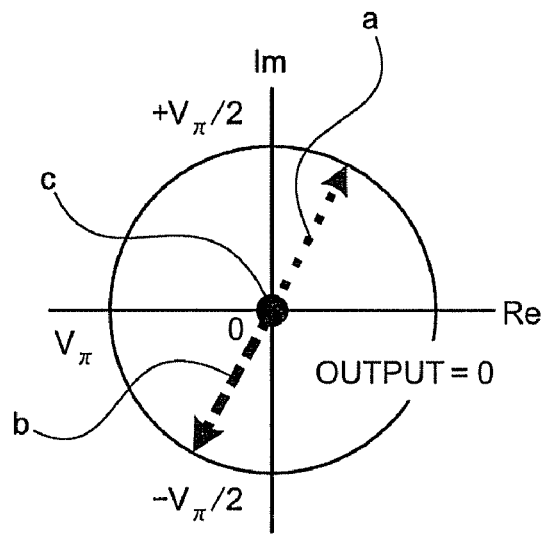
FIG. 22A is a view of a first example of an optical electric field of each optical waveguide in the conventional optical modulator.
Figure 22B:
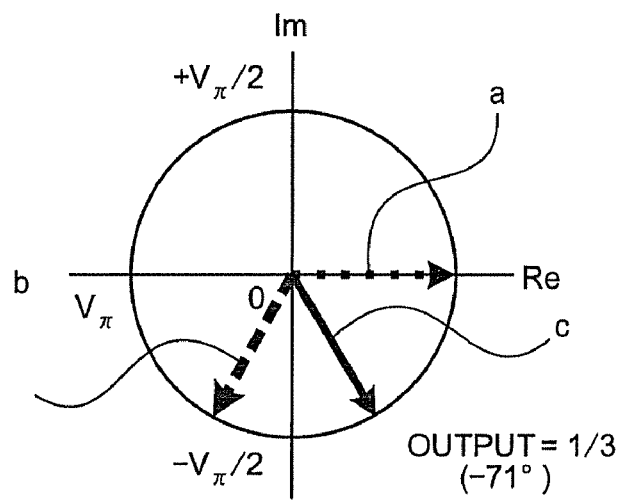
FIG. 22B is a view of a second example of an optical electric field of each optical waveguide in the conventional optical modulator.
Figure 22C:
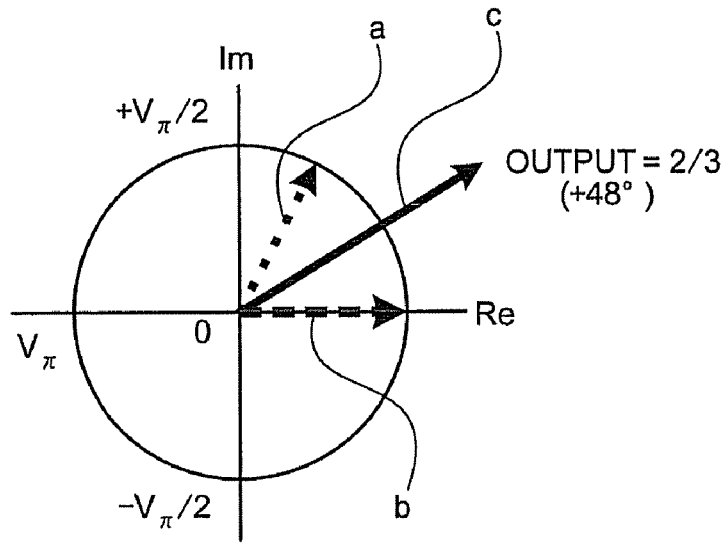
FIG. 22C is a view of a third example of an optical electric field of each optical waveguide in the conventional optical modulator.
Figure 22D:
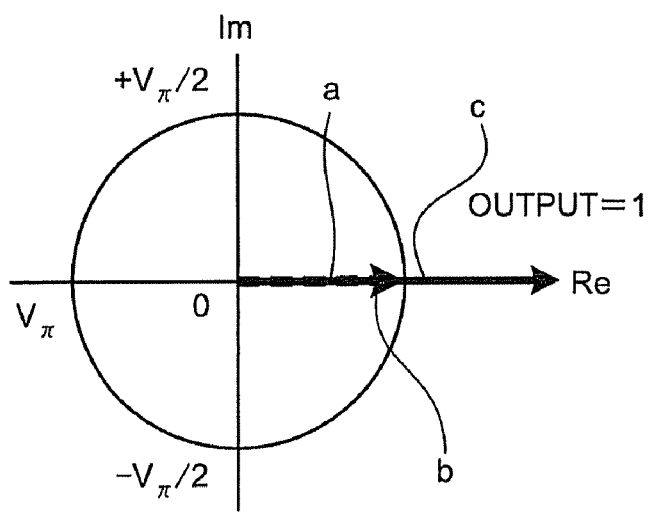
FIG. 22D is a view of a fourth example of an optical electric field of each optical waveguide in the conventional optical modulator.

FIG. 20 is a block diagram of an example of a transmitter to which an optical modulator according to the present invention is applied. As shown in FIG. 20, a transmitter 2000 including an optical modulator according to the present invention includes a laser diode (LD) 2001, an LD control circuit 2002, a signal multiplex circuit 2003, a driver 2004, and an optical modulator 2005. The LD 2001 generates continuous light to be output to the optical modulator 2005 under control by the LD control circuit 2002.

The signal multiplex circuit 2003 multiplexes an electrical signal of data to be transmitted, and outputs the multiplexed signal to the driver 2004. The driver 2004 outputs the electrical signal multiplexed by the signal multiplex circuit 2003 to the optical modulator 2005. In this example, the optical modulator 2005 is the optical modulator 100 according to the first embodiment.

The optical modulator 2005 receives the continuous light output from the LD 2001 via the incident optical waveguide 101, sends the electrical signal output from the driver 2004 to the signal electrode 103A and a signal electrode 103B to modulate the intensity of the continuous light, and transmits the intensity-modulated light as signal light to a receiver (not depicted).

The optical modulator 2005 is described as the optical modulator 100 according to the first embodiment hereinabove. However, the optical modulator 2005 is not restricted thereto, and an optical modulator according to any one of the aforementioned embodiments can be applied. Furthermore, although crossing of the optical waveguides is described to be at the boundary of the polarization reversing region and polarization non-reversing region, the optical waveguides do not necessarily have to cross each other at this boundary, and positions of the polarization reversing region and the crossing of the optical waveguides can be determined corresponding to a degree of wavelength chirp.

According to the optical modulator and the transmitter of the present invention, wavelength chirp can be reduced, and multi-valued signal light that can be readily demodulated on a receiver-side can be generated.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A Mach-Zehnder type optical modulator comprising:
an incident waveguide that branches input light into branched lights;
a pair of optical waveguides including a first optical waveguide and a second optical waveguide that respectively transmit the branched lights and exhibit an electro-optic effect;
a pair of signal electrodes including a first signal electrode and a second signal electrode respectively arranged along the pair of optical waveguides; and
an exit waveguide that outputs an interfered light of the branched lights transmitted respectively through the pair of optical waveguides, wherein
polarizations of the pair of optical waveguides are reversed respectively at a boundary, and
any one of a crossing of the first optical waveguide and the second optical waveguide or a crossing of the first signal electrode and the second electrode occurs near the boundary.

2. A Mach-Zehnder type optical modulator comprising:
an incident optical waveguide that receives a light and branches the light;
a pair of optical waveguides that are formed on a substrate exhibiting an electro-optic effect and respectively transmit the light branched by the incident optical waveguide;
a pair of signal electrodes that respectively correspond to the pair of optical waveguides individually and are arranged accordingly along the pair of optical waveguides; and
an exit optical waveguide that outputs an interfered light of the branched lights transmitted respectively through the pair of optical waveguides and transmits the interfered light as a signal light, wherein
a polarization reversing region where polarization is reversed and a polarization non-reversing region where polarization is not reversed are formed on the substrate bordered by a boundary on the substrate,
correspondences between the pair of signal electrodes and the pair of optical waveguides, switch near the boundary, and
a first optical waveguide and a second optical waveguide of the pair of optical waveguides cross each other near the boundary, and the correspondences switch.

3. The Mach-Zehnder type optical modulator according to claim 2, wherein the pair of optical waveguides are symmetrically arranged about a straight line connecting a branch point of the incident optical waveguide with an interference point of the exit optical waveguide.

4. The Mach-Zehnder type optical modulator according to claim 3, wherein a first optical waveguide and a second optical waveguide of the pair of optical waveguides cross each other at a substantially right angle.

5. The Mach-Zehnder type optical modulator according to claim 4, wherein an output power ratio at the crossing of the pair of optical waveguides is at least 15 decibels.

6. The Mach-Zehnder type optical modulator according to claim 3, wherein a directional coupler constitutes a crossing of the pair of optical waveguides.

7. The Mach-Zehnder type optical modulator according to claim 3, wherein a multimode interference coupler constitutes a crossing of the pair of optical waveguides.

8. The Mach-Zehnder type optical modulator according to claim 3, wherein a crossing of the pair of optical waveguides is a three-dimensional crossing.

9. The Mach-Zehnder type optical modulator according to claim 2, wherein among a plurality of segments that respectively correspond to a first optical waveguide and a second optical waveguide of the pair of optical waveguides and interact with the pair of signal electrodes, the segments formed in the polarization reversing region have a length that is equivalent to the segments formed in the polarization non-reversing region.

10. The Mach-Zehnder type optical modulator according to claim 2, wherein among a plurality of segments that respectively correspond to a first optical waveguide and a second optical waveguide of the pair of optical waveguides and interact with the pair of signal electrodes, a first segment extending from the boundary toward the exit optical waveguide is longer than a second segment extending from the boundary toward the incident optical waveguide.

11. The Mach-Zehnder type optical modulator according to claim 10, wherein the polarization reversing region extends from the boundary toward the incident optical waveguide.

12. The Mach-Zehnder type optical modulator according to claim 2, wherein a plurality of boundaries exist on the substrate, and the polarization reversing region and the polarization non-reversing region are alternately formed with the boundaries provided therebetween.

13. The Mach-Zehnder type optical modulator according to claim 2, wherein the pair of optical waveguides include a first optical waveguide and a second optical waveguide and interact with the pair of signal electrodes at a segment, and the segment respective to the first optical waveguide is arranged in the polarization reversing region and the segment respective to the second optical waveguide is arranged in the polarization non-reversing region.

14. The Mach-Zehnder type optical modulator according to claim 2, wherein a first optical waveguide and a second optical waveguide of the pair of optical waveguides respectively have a segment that interacts with the pair of signal electrodes and differ in length.

15. The Mach-Zehnder type optical modulator according to claim 2, wherein in the substrate, a first signal electrode and a second signal electrode of the pair of signal electrodes are arranged respectively in a first buffer layer and a second buffer layer that differ in thickness.

16. The Mach-Zehnder type optical modulator according to claim 2, wherein a distance from a first signal electrode and a second signal electrode of the pair of signal electrodes to an earth electrode respectively provided to differs.

17. The Mach-Zehnder type optical modulator according to claim 2, wherein a first signal electrode and a second signal electrode of the pair of signal electrodes are each provided with a signal electrode pad that leads out to a similar side of the substrate.

18. The Mach-Zehnder type optical modulator according to claim 17, wherein the first signal electrode and the second signal electrode have a length that is equivalent from the signal electrode pad that respectively corresponds thereto to an optical waveguide of the pair of optical waveguides that also respectively corresponds thereto.

19. The Mach-Zehnder type optical modulator according to claim 17, wherein the first signal electrode and the second signal electrode each have a detour at a position at the boundary.

20. The Mach-Zehnder type optical modulator according to claim 2, further comprising a phase modulator that modulates a phase of the signal light.

21. A transmitter comprising the Mach-Zehnder type optical modulator according to claim 2.

22. The Mach-Zehnder type optical modulator comprising:
   an incident optical waveguide that receives a light and branches the light;
   a pair of optical waveguides that are formed on a substrate exhibiting an electro-optic effect and respectively transmit the light branched by the incident optical waveguide;
   a pair of signal electrodes that respectively correspond to the pair of optical waveguides individually and are arranged accordingly along the pair of optical waveguides; and
   an exit optical waveguide that outputs an interfered light of the branched lights transmitted respectively through the pair of optical waveguides and transmits the interfered light as a signal light, wherein
   a polarization reversing region where polarization is reversed and a polarization non-reversing region where polarization is not reversed are formed on the substrate bordered by a boundary on the substrate,
   correspondences between the pair of signal electrodes and the pair of optical waveguides, switch near the boundary, and
   a first signal electrode and a second signal electrode of the pair of signal electrodes crosses each other three-dimensionally near the boundary, thereby causing the correspondences between the pair of signal electrodes and the pair of optical waveguides to switch.

23. The Mach-Zehnder type optical modulator according to claim 22, wherein at least one of the first signal electrode and the second signal electrode is formed by a wire and the three-dimensional crossing of the pair of signal electrodes near the boundary is by the wire.

24. The Mach-Zehnder type optical modulator according to claim 23, further comprising an electrode pad that bonds the wire and is provided at both ends of the wire.

25. The Mach-Zehnder type optical modulator according to claim 22, wherein at a position near the boundary, the pair of signal electrodes are arranged in a plurality of layers.

26. The Mach-Zehnder type optical modulator according to claim 25, wherein the layers are arranged through an insulating layer.

27. The Mach-Zehnder type optical modulator according to claim 25, wherein the first signal electrode and the second signal electrode cross each other three-dimensionally in a buffer layer of the substrate.

* * * * *

UNITED STATES PATENT AND TRADEMARK OFFICE
CERTIFICATE OF CORRECTION

PATENT NO. : 7,627,213 B2 Page 1 of 1
APPLICATION NO. : 11/902491
DATED : December 1, 2009
INVENTOR(S) : Masaki Sugiyama It is certified that error appears in the above-identified patent and that said Letters Patent is hereby corrected as shown below:

Column 15, Line 19, change "The Mach-Zehnder" to --A Mach-Zehnder--.

Column 15, Line 19, change "modulator" to --modulator,--.

Signed and Sealed this

Twenty-third Day of February, 2010

David J. Kappos
*Director of the United States Patent and Trademark Office*